(12) United States Patent
Sawada et al.

(10) Patent No.: US 12,305,649 B2
(45) Date of Patent: May 20, 2025

(54) ELECTRIC PUMP

(71) Applicant: Yamada Manufacturing Co., Ltd., Gunma (JP)

(72) Inventors: Tomohiro Sawada, Gunma (JP); Daisuke Kiryu, Gunma (JP); Toshihito Nagai, Gunma (JP)

(73) Assignee: Yamada Manufacturing Co., Ltd., Gunma (JP)

( * ) Notice: Subject to any disclaimer, the term of this patent is extended or adjusted under 35 U.S.C. 154(b) by 81 days.

(21) Appl. No.: 18/188,698

(22) Filed: Mar. 23, 2023

(65) Prior Publication Data

US 2023/0323883 A1 Oct. 12, 2023

(30) Foreign Application Priority Data

Mar. 28, 2022 (JP) .................................. 2022-051416

(51) Int. Cl.
*H02K 5/00* (2006.01)
*B29C 45/00* (2006.01)
(Continued)

(52) U.S. Cl.
CPC .............. *F04D 13/06* (2013.01); *B29C 45/00* (2013.01); *F04D 29/426* (2013.01); *F04D 29/628* (2013.01); *H02K 5/00* (2013.01)

(58) Field of Classification Search
None
See application file for complete search history.

(56) References Cited

U.S. PATENT DOCUMENTS 3,038,469 A * 6/1962 Jacuzzi .................... A61H 9/00
285/305
3,953,060 A * 4/1976 Eross ...................... F16L 27/12
285/305
(Continued)

FOREIGN PATENT DOCUMENTS

CN 109510363 A * 3/2019 ............... B32B 1/00
CN 112510900 A * 3/2021 ............... H02K 5/04
(Continued)

OTHER PUBLICATIONS

Translation of CN 109510363 Zhi (Obtained from USPTO Search) (Year: 2025).*
(Continued)

*Primary Examiner* — Dominick L Plakkoottam
*Assistant Examiner* — Geoffrey S Lee
(74) *Attorney, Agent, or Firm* — SoCal IP Law Group LLP; Mark Andrew Goldstein

(57) ABSTRACT

Provided is an electric pump having an elastic member that is not easily detached, and the housing formation cost is not high. The electric pump includes a pump body with a housing and an elastic member arranged on an outer circumferential surface of the housing. An elastic member arrangement portion is provided on the outer circumferential surface. A protrusion is provided on the elastic member arrangement portion. The protrusion includes a pillar portion and a fastening portion extending from the pillar portion. The fastening portion has a hook part. The elastic member has holes in two opposite ends, and the holes are engaged with the protrusion. The two opposite ends overlap with each.

3 Claims, 12 Drawing Sheets

(51) Int. Cl.
 *F04D 13/06* (2006.01)
 *F04D 29/42* (2006.01)
 *F04D 29/62* (2006.01)

(56) References Cited

U.S. PATENT DOCUMENTS

| | | | | | |
|---|---|---|---|---|---|
| 4,045,058 | A | * | 8/1977 | Eross | A61M 16/0463 |
| | | | | | 128/207.14 |
| 5,165,867 | A | * | 11/1992 | Dockery | F02M 37/103 |
| | | | | | 417/423.15 |
| 5,786,647 | A | * | 7/1998 | Vollmer | F04D 25/08 |
| | | | | | 310/91 |
| 6,021,993 | A | * | 2/2000 | Kirkwood | H02K 5/24 |
| | | | | | 310/91 |
| 6,378,834 | B1 | * | 4/2002 | Baker | F16F 15/08 |
| | | | | | 248/674 |
| 7,023,114 | B2 | * | 4/2006 | Takagi | H02K 5/225 |
| | | | | | 310/40 MM |
| 7,795,769 | B2 | * | 9/2010 | Cartwright | F04D 29/646 |
| | | | | | 160/DIG. 16 |
| 8,720,064 | B2 | * | 5/2014 | Ulrich | B29C 45/14311 |
| | | | | | 29/890.035 |
| 10,080,414 | B2 | * | 9/2018 | Douglas | F16M 13/02 |
| 10,441,050 | B2 | * | 10/2019 | Blanc | A45D 20/12 |
| 2004/0079431 | A1 | * | 4/2004 | Kissell | F16L 59/021 |
| | | | | | 138/167 |
| 2008/0089791 | A1 | * | 4/2008 | Cartwright | F04D 25/088 |
| | | | | | 416/244 R |
| 2012/0074802 | A1 | * | 3/2012 | Oi | H02K 5/10 |
| | | | | | 310/67 R |
| 2014/0097323 | A1 | * | 4/2014 | Lamb | F16F 15/08 |
| | | | | | 267/141 |
| 2018/0087533 | A1 | * | 3/2018 | Mochizuki | F04D 29/669 |
| 2019/0353153 | A1 | * | 11/2019 | Kobayashi | F04B 53/003 |
| 2025/0070613 | A1 | * | 2/2025 | Ye | A61C 17/3418 |

FOREIGN PATENT DOCUMENTS

| | | | | | |
|---|---|---|---|---|---|
| GB | 2630605 | A | * | 12/2024 | H02K 5/24 |
| JP | 2018053756 | A | | 4/2018 | |

OTHER PUBLICATIONS

Translation of CN 112510900 Tan (Obtained from USPTO Search) (Year: 2025).*

* cited by examiner

ELECTRIC PUMP

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

RELATED APPLICATION INFORMATION

This patent claims priority from Japanese Patent Application No. 2022-051416, filed Mar. 28, 2022, entitled ELECTRIC PUMP, which is incorporated herein by reference in its entirety.

BACKGROUND

Field of the Invention

The present invention relates to an electric pump.

Related Art

For example, vehicles are provided with an electric pump for circulating cooling water or the like. There is known a technique to, at the time of attaching an electric pump to a vehicle, providing an elastic member between the electric pump and a fastening article in order to prevent vibration of the electric pump from being transmitted to the vehicle. Japanese Unexamined Patent Application, Publication No. 2018-53756 describes a technique to wrap a sheet-shaped elastic member around the outer circumference of a pump body. According to this technique, a housing is provided with protrusions to be engaged with the elastic member to fix the elastic member.

Patent Document 1: Japanese Unexamined Patent Application, Publication No. 2018-53756

SUMMARY OF THE INVENTION

A conventional electric pump has a disadvantage that a wrapped elastic member is easily detached. This is because each protrusion provided on a housing does not have such a shape that makes it difficult for the elastic member to be detached. Further, in the conventional electric pump, the housing is provided with a plurality of protrusions. Therefore, there is a disadvantage that the cost for forming the housing is likely to be high.

It is an object of the present invention to provide such an electric pump that the elastic member is not easily detached, and the formation cost is not likely to be high.

An electric pump according to an embodiment of the present invention includes: a pump body including a pump unit and a housing covering the pump unit; and an elastic member arranged on an outer circumferential surface of the housing, the outer circumferential surface including an elastic member arrangement portion where the elastic member is arranged, the elastic member arrangement portion including a protrusion, the protrusion including a pillar portion extending in a direction of a normal line from the outer circumferential surface and a fastening portion extending from the pillar portion, the fastening portion including a hook part protruding in a circumferential direction of the housing relative to the pillar portion, the elastic member having holes formed in two opposite ends in a longitudinal direction of the elastic member, respectively. The holes are engaged with the protrusion, the two opposite ends overlap with each other in a thickness direction of the opposite ends, and a distance from a surface of the elastic member arrangement portion to an outer surface of the elastic member in a radial direction of the housing in a part where the two opposite ends overlap with each other is equal to the distance in a part other than the part.

According to the present invention, it is possible to provide such an electric pump that the elastic member is not easily detached, and the housing formation cost is not likely to be high.

DETAILED DESCRIPTION OF THE INVENTION

Electric Pump

Figure 1:
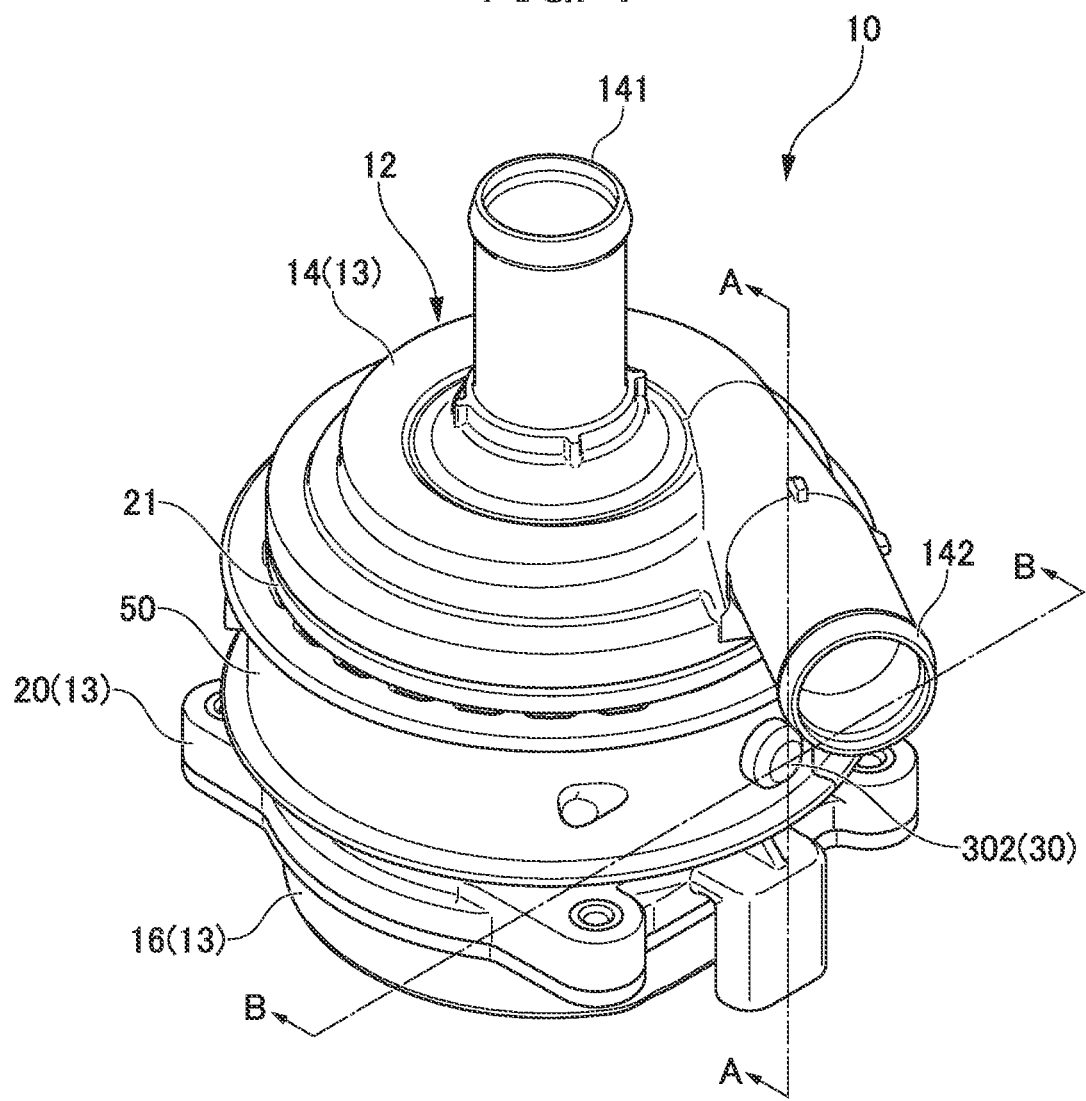
FIG. 1 is a perspective view showing an electric pump of the present invention.

An electric pump 10 of an embodiment of the present invention is described based on FIG. 1. FIG. 1 is a perspective view schematically showing the electric pump 10. As shown FIG. 1, the electric pump 10 includes a pump body 12 and an elastic member 50.

Pump Body

The pump body 12 is provided with a pump unit (not shown), a motor unit (not shown) and a case 13. The motor unit is a motor that drives the pump unit. The case 13 is a member that covers the pump unit and the motor unit. Since the pump unit and the motor unit are covered with the case 13, they are not shown in FIG. 1.

Case

The case 13 is provided with a first case unit 14, a second case unit 16 and a housing 20. The housing 20 has a substantially cylindrical shape, both ends of which are open. The housing 20 covers the motor unit. The first case unit 14 and the second case unit 16 are attached so as to close openings on one end and the other end of the housing 20, respectively, and constitute the case 13 together with the housing 20. The first case unit 14 is provided with a suction port 141 and a discharge port 142 of the pump body 12.

Elastic Member

Figure 2:
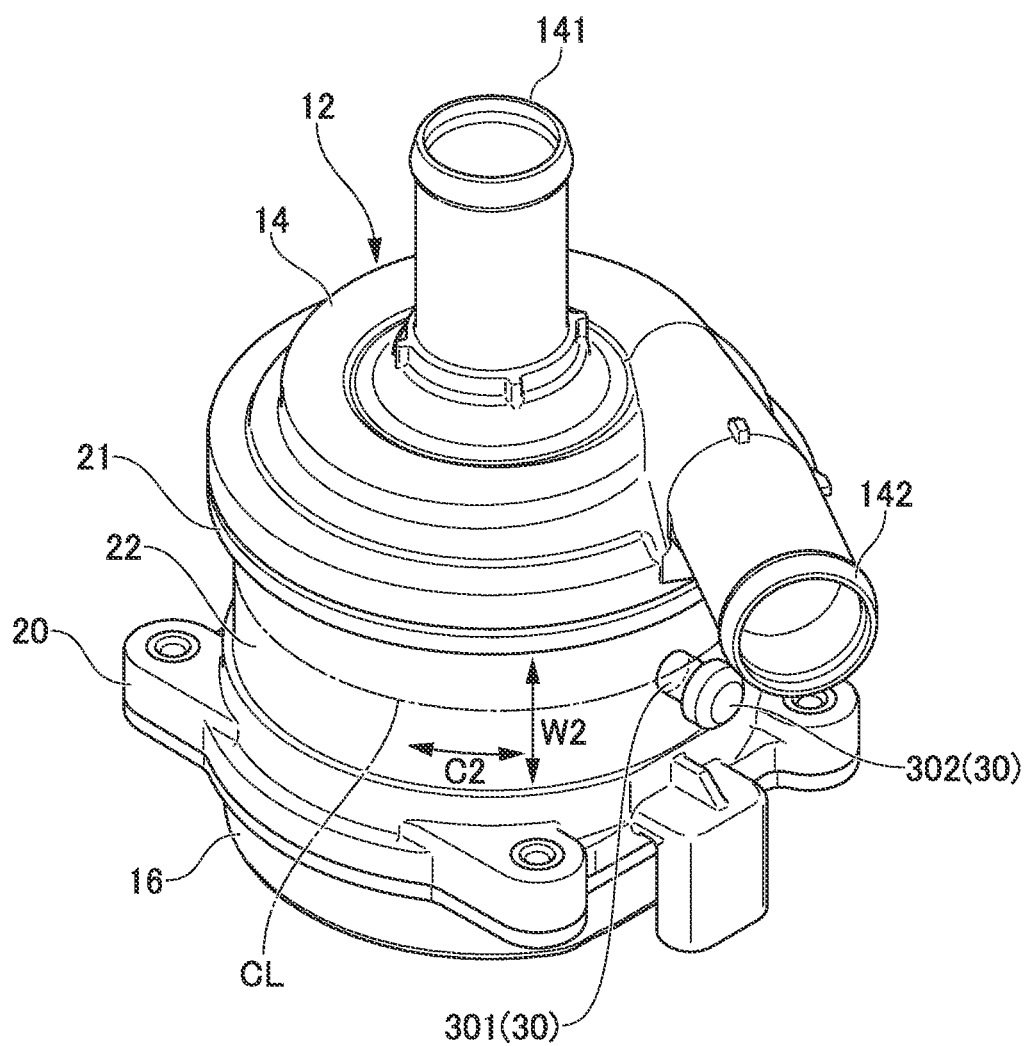
FIG. 2 is a perspective view showing a pump body of the present invention.
Figure 3A:
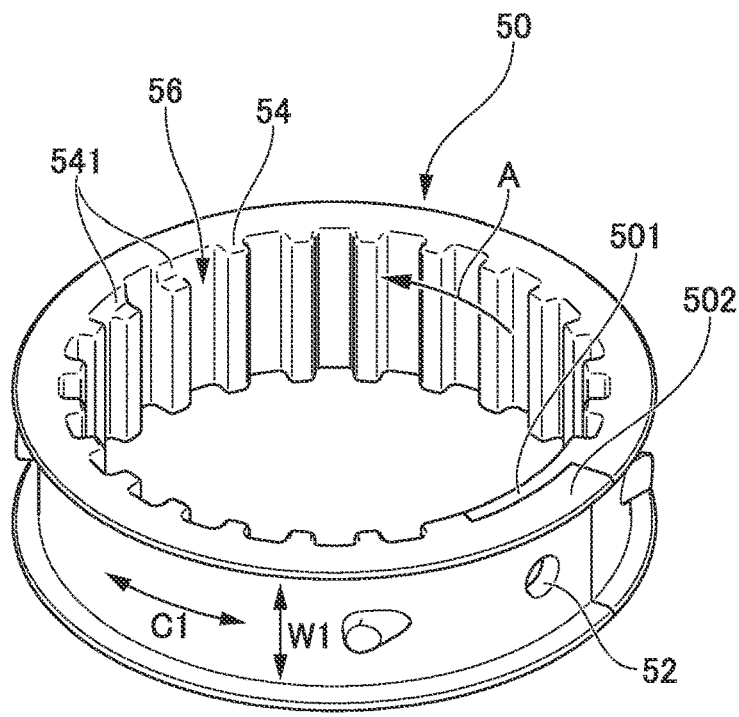
FIGS. 3A and 3B show perspective views of an elastic member of the present invention, and show a correct wrapping way and a wrong wrapping way, respectively.
Figure 3B:
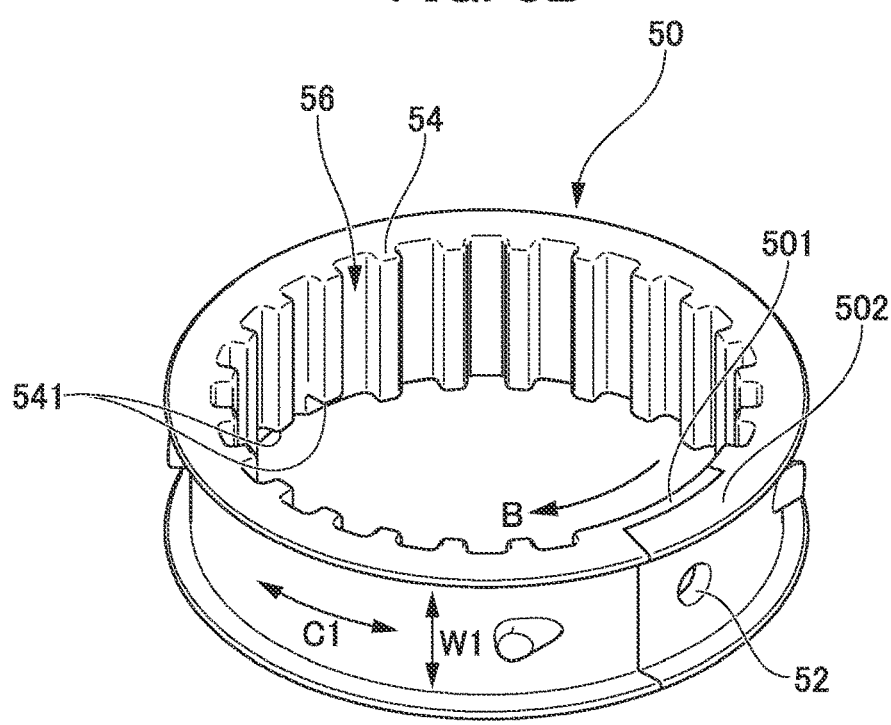

The elastic member 50 is a member to be wrapped around the pump body 12. The elastic member 50 is formed by a material having elasticity, such as a rubber material. FIG. 2 is a perspective view of the pump body 12 without the elastic member 50 wrapped therearound. FIGS. 3A and 3B are perspective views of the elastic member 50. As shown in FIG. 1 to FIGS. 3A and 3B, the elastic member 50 is arranged on an outer circumferential surface 21 of the housing 20. Specifically, as shown in FIG. 2, the outer circumferential surface 21 of the housing 20 has an elastic member arrangement portion 22. The elastic member arrangement portion 22 is a belt-shaped portion extending in the circumferential direction on the outer circumference of the housing 20. As shown in FIG. 1, the elastic member 50 is arranged on the elastic member arrangement portion 22 on the outer circumferential surface 21 of the housing 20. Details of the elastic member 50 are described later.

Fastener

Figure 4:
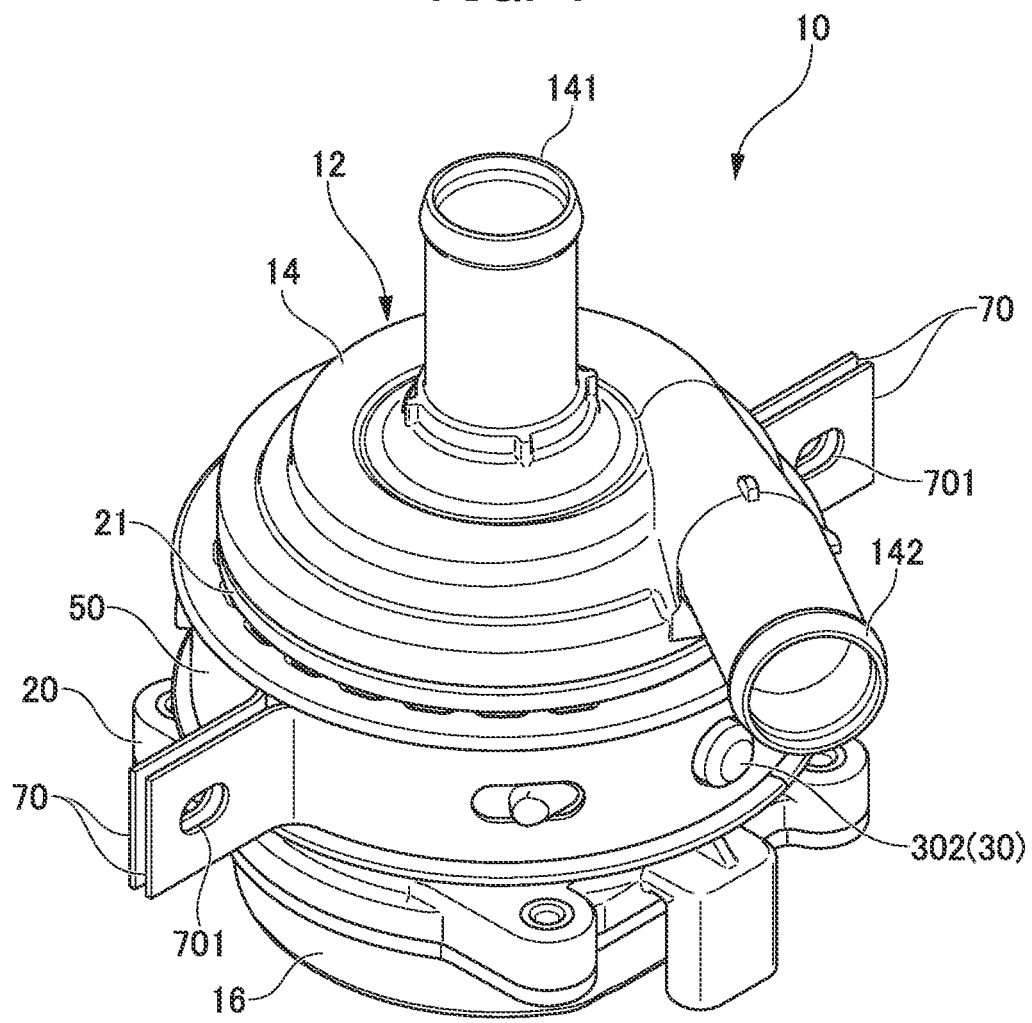
FIG. 4 is a perspective view of the electric pump of the present invention that is provided with a fastener.

FIG. 4 is a perspective view of the electric pump 10 provided with fasteners 70. The electric pump 10 is fixed to an apparatus via the fasteners 70. Each fastener 70 is a fastening article that is used to fix the electric pump 10 to an apparatus such as a vehicle. Each fastener 70 is formed by metal or the like. As shown in FIG. 4, each fastener 70 is a belt-shaped metal plate member that has such a shape that a part except one end and the other end is circularly bent, and the one end of one fastener 70 overlaps with the other end of the other fastener 70. The fasteners 70 are arranged so that the bent parts are along the outer circumference of the elastic member 50 wrapped around the pump body 12. The one end and the other end of the fastener 70 each have a fastening hole 701, and the fastening holes 701 penetrate the ends in a state they overlap with each other. The fasteners 70 are fixed to an apparatus (not shown) with screws (not shown) inserted in the fastening holes 701. In a state where the electric pump 10 is fixed to the apparatus, the elastic member 50 plays a role of absorbing vibration between the electric pump 10 and the apparatus. Thereby, it is possible to prevent vibration of the electric pump 10 from being transmitted to the apparatus and/or prevent vibration of the apparatus from being transmitted to the electric pump 10.

Fixation of the Elastic Member

The electric pump 10 of the present embodiment has a protrusion 30 that is provided on the elastic member arrangement portion 22 of the housing 20. Further, the elastic member 50 is provided with an engaging hole 52. The protrusion 30 is a portion that protrudes from the elastic member arrangement portion 22 to thereby fix the elastic member 50. The engaging hole 52 can be engaged with the protrusion 30 by being fitted around the protrusion 30. As shown in FIG. 1, by the engaging hole 52 being fitted around the protrusion 30, the elastic member 50 is fixed to the pump body 12.

Protrusion

Figure 5:
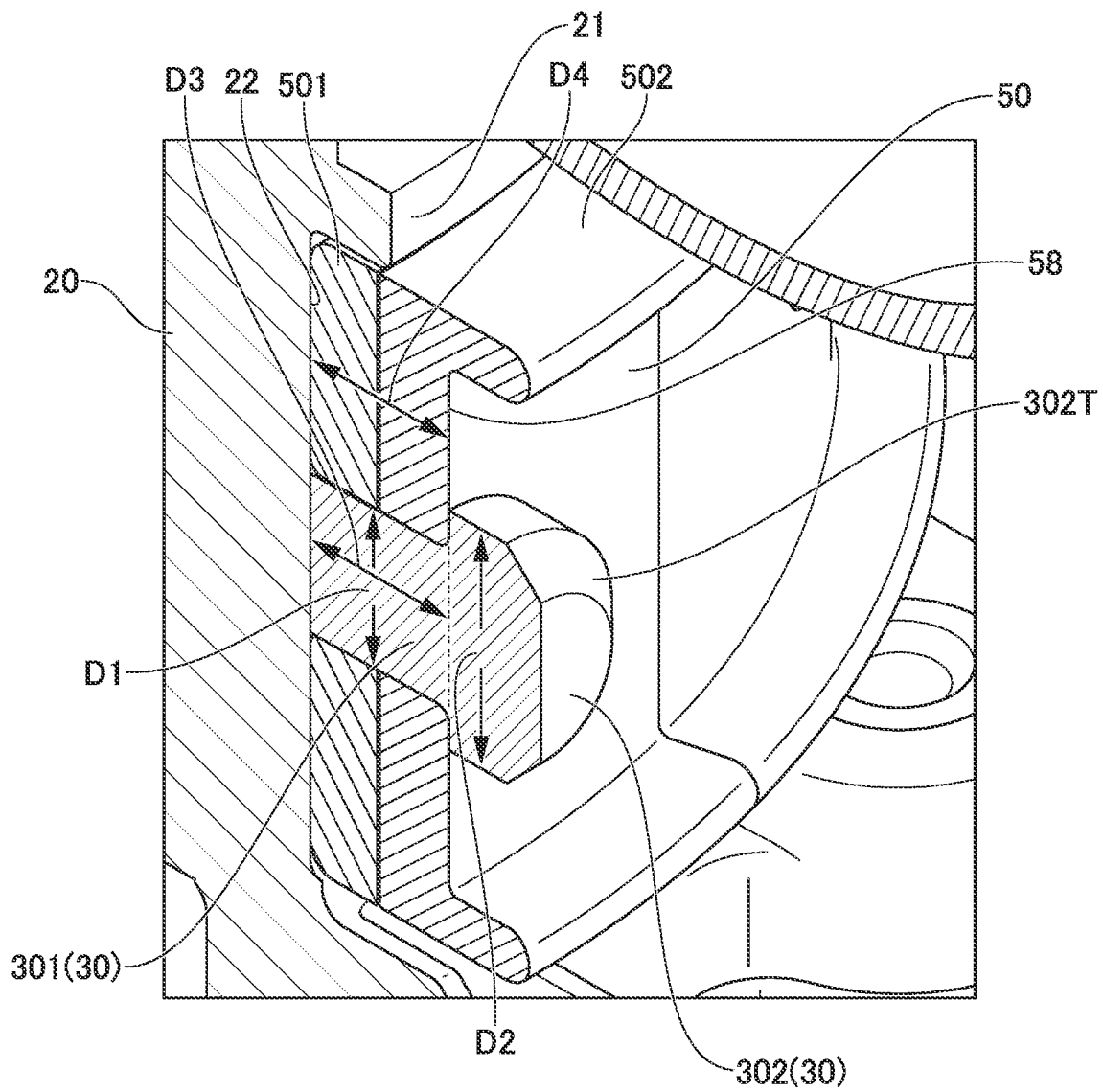
FIG. 5 is a cross-sectional view taken along line A-A in FIG. 1.
Figure 6:
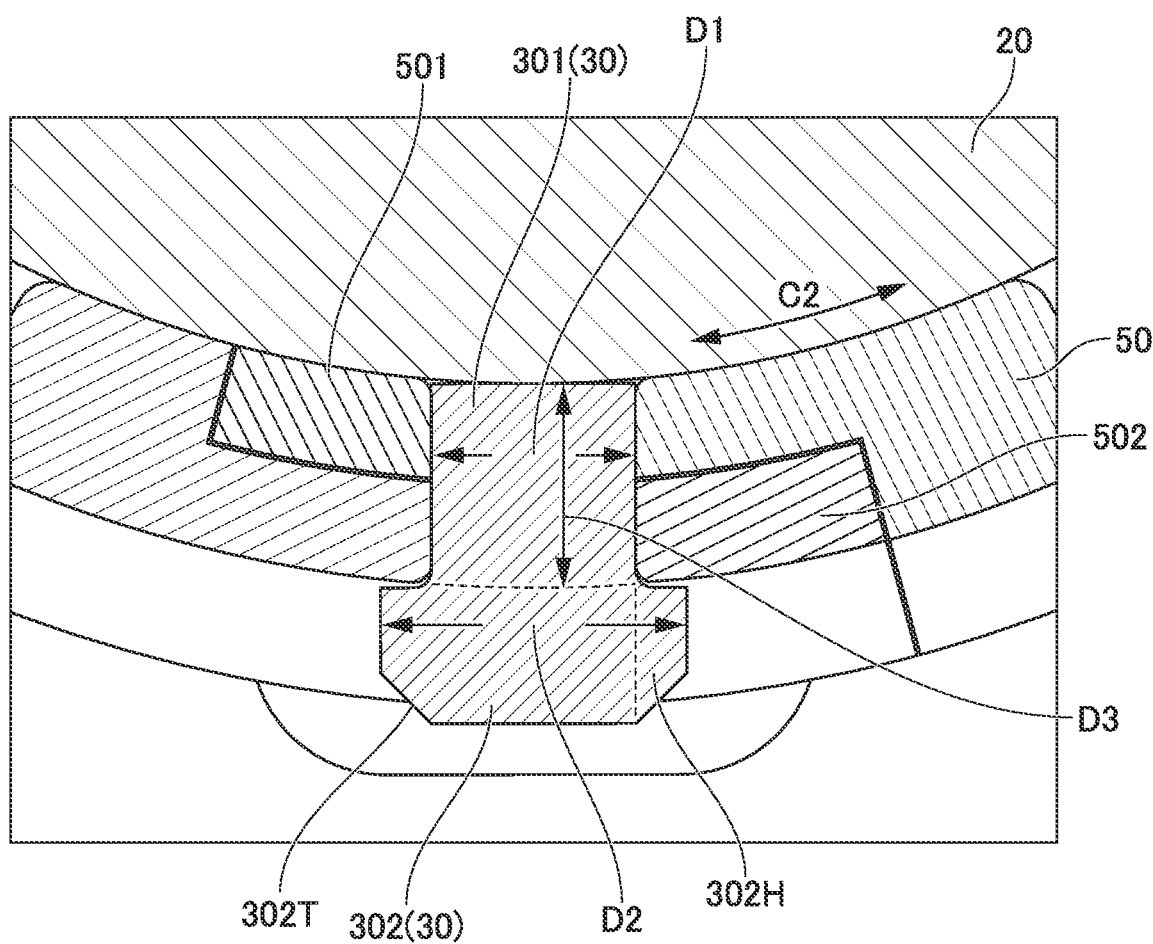
FIG. 6 is a cross-sectional view taken along line B-B in FIG. 2.

The protrusion 30 is described by referring to FIGS. 5 and 6. FIG. 5 is a cross-sectional view taken along line A-A in FIG. 1, and FIG. 6 is a cross-sectional view taken along line B-B in FIG. 2. The protrusion 30 includes a pillar portion 301 and a fastening portion 302. The pillar portion 301 is a portion that protrudes from the elastic member arrangement portion 22 and supports, at the end thereof, the fastening portion 302. The fastening portion 302 is a portion that extends from the end of the pillar portion 301 and makes it difficult for the elastic member 50 fitted to the protrusion 30 to be detached from the protrusion 30.

Orientation of the Protrusion

As shown in FIG. 2, the elastic member arrangement portion 22 forms a circumference with a predetermined width, like the side face of a circular column. The protrusion 30 protrudes from the surface of the elastic member arrangement portion 22 in a radial direction of the circumference. That is, the protrusion 30 protrudes from the elastic member arrangement portion 22 in the direction of the normal line thereof.

Position of the Protrusion

The protrusion 30 is arranged at about the middle of the predetermined width of the elastic member arrangement portion 22. In FIG. 2, the width direction of the elastic member arrangement portion 22 is indicated by the arrow W2. In FIG. 2, the circumferential direction of the elastic member arrangement portion 22 is indicated by the arrow C2. The line CL shown in FIG. 2 is the center line of the elastic member arrangement portion 22 in the width direction. The center line CL extends in the circumferential direction C2 along the middle position of the elastic member arrangement portion 22 in the width direction W2. As shown in FIG. 2, the protrusion 30 is arranged on the center line CL.

Shape of the Protrusion

The pillar portion 301 has a circular column shape. The fastening portion 302 also has a substantially circular column shape. The pillar portion 301 and the fastening portion 302 are different in the diameter of the circular column shape. The diameter of the fastening portion 302 is larger than the diameter of the pillar portion 301. As shown in FIG. 6, the fastening portion 302 has a hook part 302H protruding in the circumferential direction C2 of the elastic member arrangement portion 22 relative to the pillar portion 301. Thereby, the fastening portion 302 prevents the elastic member 50 fitted around the pillar portion 301 from being detached from the pillar portion 301. This is because the engaging hole 52 of the elastic member 50 is hooked by the hook part 302H, thereby making the elastic member 50 resistant to detachment from the fastening portion 302.

Diameter of the Protrusion

The diameters of the pillar portion 301 and the fastening portion 302 are described in this paragraph. In FIGS. 5 and 6, the diameters of the pillar portion 301 and the fastening portion 302 are indicated by D1 and D2, respectively. Here, D1 and D2 are in a relationship expressed as $D1<D2$. In FIGS. 5 and 6, a case where $D1 \times 1.5 = D2$ is satisfied is exemplified. The diameter D1 of the pillar portion 301 and the diameter D2 of the fastening portion 302 satisfying the above relationship make it possible to achieve both the fitting easiness at the time of fitting the engaging hole 52 of the elastic member 50 around the protrusion 30 and the resistance of the fitted elastic member 50 to detachment from the protrusion 30.

Shape of the Fastening Portion

The fastening portion 302 has a substantially circular column shape as described above. The shape of the fastening portion 302, however, is not a perfect circular column shape. This is because the fastening portion 302 is provided with a tapered part 302T. The tapered part 302T is formed by cutting off a part of the circular column shape. The tapered part 302T is provided on a corner part of the fastening portion 302 away from the elastic member arrangement portion 22. The tapered part 302T enhances the fitting easiness at the time of fitting the engaging hole 52 of the elastic member 50 around the protrusion 30. On the other hand, a corner part of the fastening portion 302 closer to the elastic member arrangement portion 22 is not provided with a tapered part. Therefore, the elastic member 50 fitted around the pillar portion 301 of the protrusion 30 is not easily detached from the protrusion 30.

Other Shapes of the Protrusion

Figure 7:
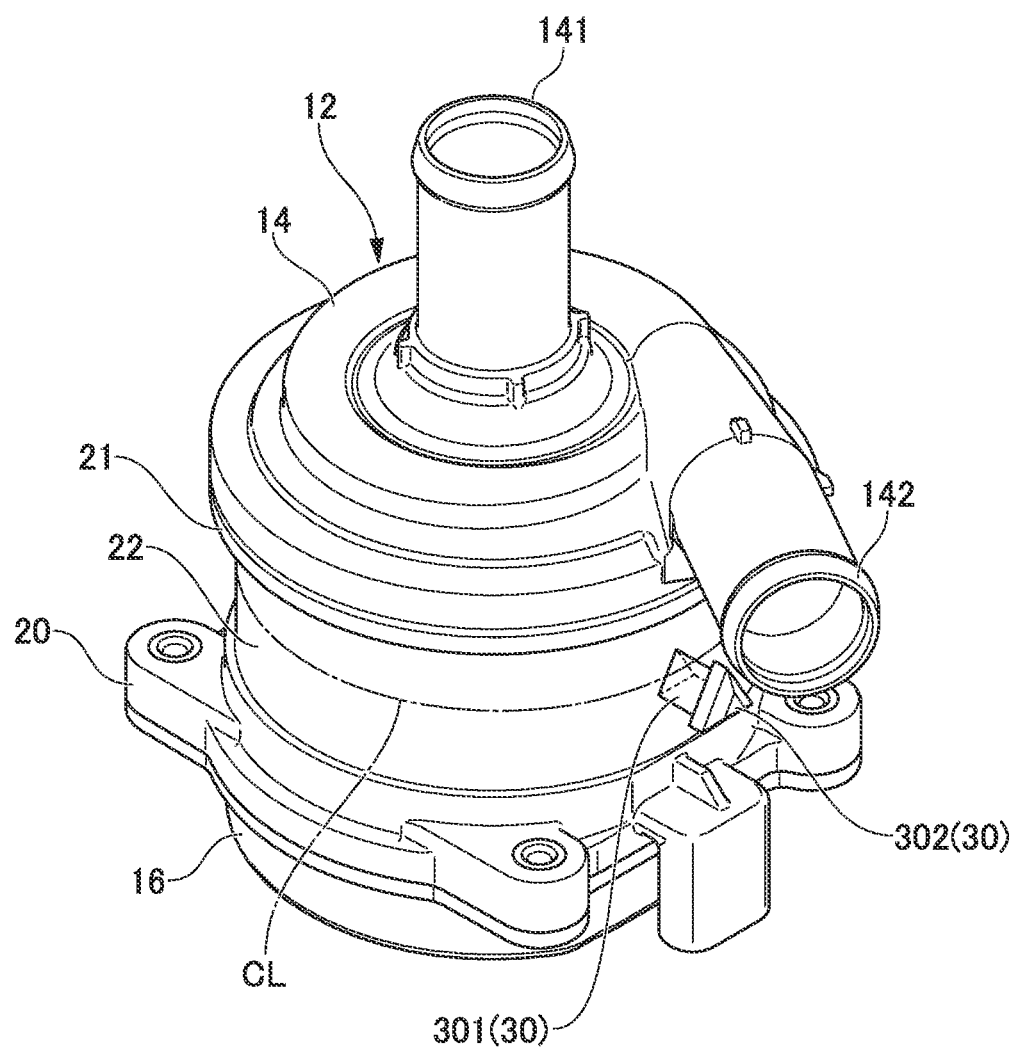
FIG. 7 is a perspective view of the pump body showing a protrusion of the present invention in another shape.

The shape of the protrusion 30 is not limited to a circular column shape. For example, the protrusion 30 can be in a triangular prism shape or a quadrangular prism shape. FIG. 7 is a perspective view of the pump body 12 and shows the protrusion 30 in another shape. As shown in FIG. 7, the pillar portion 301 and the fastening portion 302 of the protrusion 30 can be in triangular prism shapes.

Other Arrangements of the Protrusion

Figure 8:
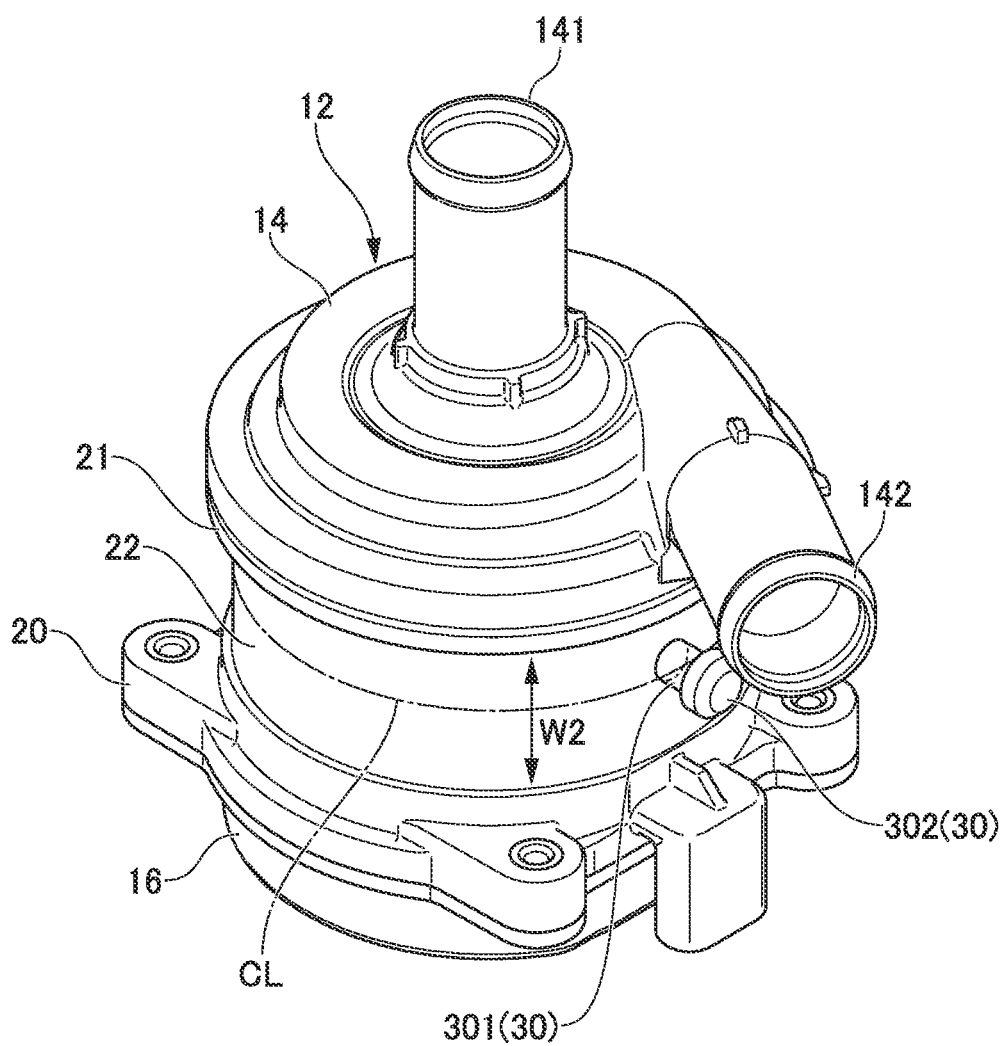
FIG. 8 is a perspective view of the pump body showing the protrusion of the present invention arranged at another position.

The arrangement of the position of the protrusion 30 is not limited to the center line CL. For example, the protrusion 30 can be provided at a position other than the middle of the width direction W2 of the elastic member arrangement portion 22. FIG. 8 is a perspective view of the pump body 12 and shows the protrusion 30 arranged at another position. As shown in FIG. 8, the protrusion 30 can be arranged at a position deviated from the center line CL in the width direction W2.

Prevention of Wrong Assembly

Both of the protrusion 30 shown in FIG. 7 and the protrusion 30 shown in FIG. 8 have shapes that are not symmetrical when the center line CL is defined as the axis of symmetry. This configuration makes it possible to prevent wrong assembly of the elastic member 50. The wrong assembly refers to wrapping the elastic member 50 around the elastic member arrangement portion 22 in a wrong direction. The wrong assembly is described later.

Protrusion Formation Method

Examples of a method of forming the protrusion 30 on the elastic member arrangement portion 22 include the following. One exemplar method is to attach the protrusion 30 to the elastic member arrangement portion 22. Another exemplar method is to mold the protrusion 30 and the elastic member arrangement portion 22 as one-piece component. According to this method, the protrusion 30 and at least a part of the housing 20 are molded into a one-piece component. According to the method of attaching the protrusion 30 to the elastic member arrangement portion 22, a part to function as the protrusion 30 is prepared, and the part is attached to the elastic member arrangement portion 22 by welding or the like. The method of molding the protrusion 30 and the elastic member arrangement portion 22 as a one-piece component are described later.

Elastic Member

The elastic member 50 is described by referring to FIGS. 3A and 3B and the like. Two ends of the long-belt-shaped elastic member 50 in the longitudinal direction thereof are defined as a first end 501 and a second end 502. As shown in FIGS. 3A and 3B, the elastic member 50 is annularly formed by overlapping the first end 501 with the second end 502 and is arranged on the elastic member arrangement portion 22.

Elastic Member Protruding Portions and Elastic Member Receding Portions

As shown in FIGS. 3A and 3B, the elastic member 50 is provided with elastic member protruding portions 54. For the elastic member 50, a surface that faces the elastic member arrangement portion 22 in a state where the elastic member 50 is arranged on the elastic member arrangement portion 22 is defined as the inner surface. The elastic member protruding portions 54 are provided on the inner surface of the elastic member 50. The circumferential direction of the elastic member 50 in a state in which the elastic member 50 forms a circle as shown in FIGS. 3A and 3B is indicated by an arrow C1 in FIGS. 3A and 3B. A width direction of the elastic member 50 is indicated by W1. The elastic member protruding portions 54 extend from one end to the other end of the elastic member 50 in the width direction W1. The plurality of the elastic member protruding portions 54 are provided at regular intervals in the circumferential direction C1. Therefore, each elastic member receding portion 56 is formed between adjacent elastic member protruding portions 54. The elastic member protruding portions 54 and the elastic member receding portions 56 can prevent propagation of vibration between the elastic member 50 and the pump body 12 in a state where the elastic member 50 is arranged on the elastic member arrangement portion 22.

Diameter of the Engaging Hole

The engaging hole 52 is described in more detail by referring to FIGS. 3A and 3B and FIGS. 5 and 6. The engaging hole 52 to be fitted around the protrusion 30 is provided in the first end 501 and the second end 502 of the elastic member 50. As shown in FIGS. 3A and 3B, the engaging hole 52 is circular in a plan view. As shown in FIGS. 5 and 6, the diameter of the engaging hole 52 is smaller than the fastening portion 302. In the case where the fastening portion 302 has a circular column shape, the diameter of the engaging hole 52 is smaller than the diameter D2 of the fastening portion 302. Thereby, it is possible to make the elastic member 50 resistant to detachment from the protrusion 30 when the first end 501 and the second end 502 are fitted around the protrusion 30. Furthermore, in the case where the diameter of the engaging hole 52 of the elastic member 50 is smaller than the diameter of the pillar portion 301, the elastic member 50 is more firmly fixed to the elastic member arrangement portion 22. Further, the first end 501 and the second end 502 are prevented from being detached from the protrusion 30 beyond the fastening portion 302. This is because the diameter D2 of the fastening portion 302 is larger than the diameter D1 of the pillar portion 301.

Shapes and Thicknesses of the Ends

The shapes and thicknesses of the first end 501 and the second end 502 are described by referring to FIGS. 3A and 3B and FIGS. 5 and 6. As shown in FIGS. 3A and 3B and FIGS. 5 and 6, the first end 501 and the second end 502 have shapes that fit to each other when the first end 501 and the second end 502 are overlapped with each other. That is, when the elastic member 50 is arranged on the elastic member arrangement portion 22, the first end 501 is positioned inside relative to second end 502 and is in contact with the elastic member arrangement portion 22. On the other hand, the second end 502 is positioned outside relative to the first end 501 and is in contact with the first end 501 without being in contact with the elastic member arrangement portion 22. As shown in FIGS. 3A and 3B, in the elastic member 50, the part where the first end 501 and the second end 502 overlap with each other and the other part have the same apparent thickness. This is because, in order that the overlapping part is not thicker than the other part when the first end 501 and the second end 502 are overlapped, the positions to be overlapped of the first end 501 and the second end 502 are thin. Here, the apparent thickness means the thickness of the elastic member 50 in the radial direction in the state in which the elastic member 50 is in an annular shape.

This is specifically described with reference to FIG. 5. In FIG. 5, the apparent thickness is indicated by D4. As shown in FIG. 5, the apparent thickness D4 is a distance from the surface of the elastic member arrangement portion 22 to an outer surface 58 of the elastic member 50. In the electric pump 10 of the present embodiment, the apparent thickness D4 of the elastic member 50 is the same in the part where the first end 501 and the second end 502 overlap with each other and in the other part. Thereby, it becomes easy to attach the electric pump 10 to an apparatus. As described with reference to FIG. 4, the electric pump 10 is attached to an apparatus via the fasteners 70 arranged outside the elastic member 50. This is because, if the apparent thickness D4 of the elastic member 50 is uniform, the electric pump 10 can be fixed to the apparatus without looseness, without having to form the fasteners 70 into a complicated shape.

Fixation by the Protrusion

In FIGS. 5 and 6, the height of the pillar portion 301 is indicated by D3. As shown in FIGS. 5 and 6, the thickness of the part where the first end 501 and the second end 502 overlap with each other, that is, the apparent thickness D4 of the elastic member 50 is the same as the height D3 of the pillar portion 301. Thereby, when the first end 501 and the second end 502 are fitted around the protrusion 30, the protrusion 30, especially the fastening portion 302 can fix the elastic member 50 to the elastic member arrangement portion 22 without looseness.

In the case of a conventional electric pump, an elastic member may be detached from a pump body during a period from attachment of the elastic member to the pump body until fixation of the electric pump to an apparatus by means of fasteners. In contrast, the electric pump 10 of the present embodiment has the elastic member 50 engaged with the protrusion 30 having the configuration as described above. Therefore, it is possible to prevent the elastic member 50 from being detached off from the pump body 12 by way of a simple structure.

Method of Providing Protrusion on Housing

Figure 9:
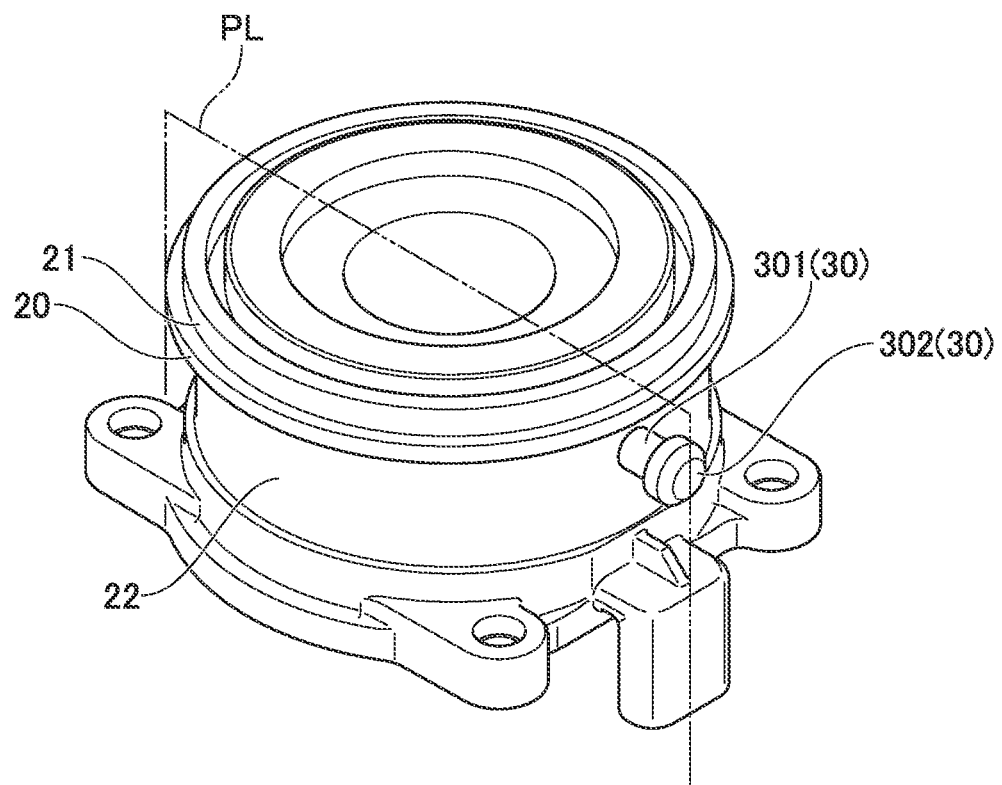
FIG. 9 is a perspective view showing the housing and the protrusion of the present invention.

A method of molding the protrusion 30 and at least a part of the housing 20 as a one-piece component is described by referring to FIG. 9. FIG. 9 is a perspective view showing the housing 20 and the protrusion 30 of the present embodiment. The line PL in FIG. 9 indicates a parting line. The parting line means the following. In the case of molding a thing with a mold, it is necessary to divide the mold to removing the molded thing from the mold. The parting line means a line along which the mold is to be divided. In the case of the electric pump 10 of the present embodiment, setting the line PL as the parting line for the molding process makes it possible to mold the protrusion 30 and at least a part of the housing 20 including the elastic member arrangement portion 22 as a one-piece component. This is because, if the line PL is set as the parting line, a part of the mold for molding the protrusion 30 can be divided without being interfered with the molded protrusion 30.

A specific manufacturing method is, for example, as follows. The manufacturing method includes: filling a mold having the parting line PL at a position corresponding to the protrusion 30 with a resin material; hardening the resin material in the mold; and dividing the mold along the parting line PL to eject the resultant molding made of the hardened resin material and forming the at least a part of the elastic member arrangement portion 22 and the protrusion 30. Thereby, it is possible to easily form the housing 20 including the elastic member arrangement portion 22 on which the protrusion 30 is provided.

Prevention of Wrong Assembly

The prevention of wrong assembly is described in this paragraph. The wrong assembly means to wrap the elastic member 50 in a wrong direction around the elastic member arrangement portion 22. This is described with reference to FIGS. 3A and 3B. FIG. 3A shows a correct way of wrapping the elastic member 50 at the time of wrapping the elastic member 50 around the elastic member arrangement portion 22. In comparison, FIG. 3B shows a wrong way of wrapping. The way of wrapping shown in FIG. 3A is referred to as correct assembly, and the way of wrapping shown in FIG. 3B is referred to as wrong assembly. In FIGS. 3A and 3B, members other than the elastic member 50, such as the housing 20, are omitted to make the drawings easier to view. The wrong assembly corresponds to a vertical inversion of the correct assembly. In the case of the correct assembly shown in FIG. 3A, the elastic member 50 is wrapped in a direction of the arrow A when the engaging hole 52 of the first end 501 is a starting point. Then, by overlapping the engaging hole 52 of the second end 502 with the engaging hole 52 of the first end 501, the elastic member 50 is wrapped in a circle shape. In contrast, in the case of the wrong assembly shown in FIG. 3B, the elastic member 50 is wrapped in a direction of the arrow B when the engaging hole 52 of the first end 501 is a starting point. Then, by overlapping the engaging hole 52 of the second end 502 with the engaging hole 52 of the first end 501, the elastic member 50 is wrapped in a circle shape. The arrows A and B indicate opposite directions. Thus, the correct assembly and the wrong assembly are different in the direction of in which the elastic member 50 is wrapped. As a result, the wrapped elastic member 50 in the case of the correct assembly and the wrapped elastic member 50 in the case of the wrong assembly are in forms inverted upside down.

Further, the correct assembly and the wrong assembly have notches 541 at different positions in the width direction W1 due to the difference in the way of wrapping as described above. That is, in the case of the correct assembly, the notches 541 are located at an upper position in the width direction W1 as shown in FIG. 3A. In comparison, in the case of wrong assembly, the notches 541 are located at a lower position in the width direction W1 as shown in FIG. 3B.

Prevention of Wrong Assembly by Shape of Protrusion

As a method of preventing wrong assembly, there is a method in which the protrusion 30 is formed into a shape that is asymmetrical with respect to the center line CL as the axis of symmetry. As such a shape of the protrusion 30, for example, the shape shown in FIG. 7 is exemplified. The pillar portion 301 and the fastening portion 302 of the protrusion 30 shown in FIG. 7 are in triangular prism shapes. In the case where the protrusion 30 has such a shape, if the wrong assembly is attempted, the shape of the engaging hole 52 of the elastic member 50 does not match the shape of the protrusion 30, and the engaging hole 52 cannot be fitted around the protrusion 30. Thereby, it is possible to prevent the wrong assembly. The shape of the protrusion 30 shown in FIG. 7 is a non-limiting example. Various shapes of the protrusion 30 that are asymmetrical when the center line CL is defined as axis of symmetry are conceivable. All of them have the effect of preventing wrong assembly.

Shape of Engaging Hole of Elastic Member

The shape of the engaging hole 52 of the elastic member 50 corresponds to the shape of the protrusion 30. That is, when the shape of the protrusion 30 is circular columnar as shown in FIG. 2, the shape of the engaging hole 52 is a circle as shown in FIGS. 3A and 3B. Likewise, when the shape of the protrusion 30 is a triangular prism as shown in FIG. 7, the shape of the engaging hole 52 is a triangle.

Prevention of Wrong Assembly by Arrangement of Protrusion

As another method of preventing wrong assembly, there is a method in which the protrusion 30 is arranged at a position other than the position on the center line CL of the elastic member arrangement portion 22 as described above. As such arrangement of the protrusion 30, for example, arrangement shown in FIG. 8 is exemplified. The protrusion 30 shown in FIG. 8 is arranged at a position deviated from the center line CL of the elastic member arrangement portion 22. In the case where the protrusion 30 is arranged at such a position, if wrong assembly is attempted, the position of the engaging hole 52 of the elastic member 50 does not correspond to the position of the protrusion 30, and the engaging hole 52 cannot be fitted around the protrusion 30. Thereby, it is possible to prevent the wrong assembly. The arrangement of the protrusion 30 shown in FIG. 8 is a non-limiting example. As a position other than the position on the center line CL of the elastic member arrangement portion 22 where the protrusion 30 is to be arranged, various positions are conceivable. All of them have the effect of preventing wrong assembly.

Position of Engaging the Hole in the Elastic Member

The position of the engaging the hole 52 in the elastic member 50 corresponds to the position of the protrusion 30. That is, the position of the engaging hole 52 is changed by a length corresponding to the length by which the position of the protrusion 30 is deviated from the center line CL.

Prevention of Wrong Assembly by Housing Protruding Portion

Figure 10:
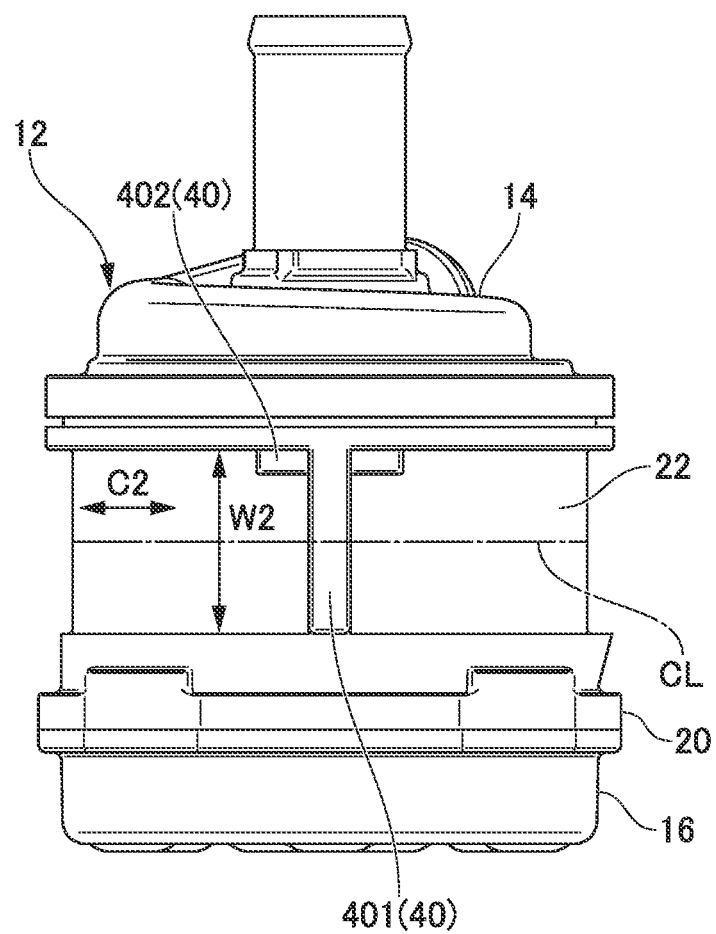
FIG. 10 is a side view of the pump body provided with a housing protruding portion of the present invention.

As another method of preventing wrong assembly, there is a method in which a housing protruding portion is formed on the elastic member arrangement portion 22 of the housing 20. This is described with reference to FIGS. 10 and 11. FIG. 10 is a partial side view of the pump body 12 with a housing protruding portion 40 provided on the elastic member arrangement portion 22. FIG. 10 is a diagram showing the pump body 12 seen from a point opposite to the protrusion 30 of the elastic member arrangement portion 22 extending in the shape of the side face of a circular column. A housing protruding portion 40 is formed on the surface of the elastic member arrangement portion 22. The elastic member arrangement portion 22 extends in the circumferential direction with a predetermined width, like the side face of a circular column. The housing protruding portion 40 protrudes from the circumferential surface of the elastic member arrangement portion 22 and protrudes in a radial direction of circumference. That is, the housing protruding portion 40 protrudes from the elastic member arrangement portion 22 in the direction of the normal line thereof. The housing protruding portion 40 includes a first protruding portion 401 and second protruding portions 402. The first protruding portion 401 is a part of the housing protruding portion 40 that is symmetrical when the center line CL of the elastic member arrangement portion 22 is defined as the axis of symmetry. The second protruding portions 402 are parts of the housing protruding portion 40 that are asymmetrical when the center line CL of the elastic member arrangement portion 22 is defined the axis of symmetry. That is, the second protruding portions 402 are asymmetric parts of the housing protruding portion 40. On the elastic member arrangement portion 22, a direction along the center line CL is defined as the circumferential direction, and a direction orthogonal to the center line CL is defined as the width direction. In FIG. 10, the circumferential direction is indicated by the arrow C2, and the width direction is shown by the arrow W2. The first protruding portion 401 of the housing protruding portion 40 shown in FIG. 10 extends in the width direction W2 from one end to the other end of the elastic member arrangement portion 22 in the width direction W2. On the other hand, the second protruding portions 402 extend in the circumferential direction C2 on one end of the elastic member arrangement portion 22 in the width direction W2. Thus, the housing protruding portion 40 has a substantial T shape.

Elastic Member Protruding Portions Corresponding to Housing Protruding Portion

Figure 11:
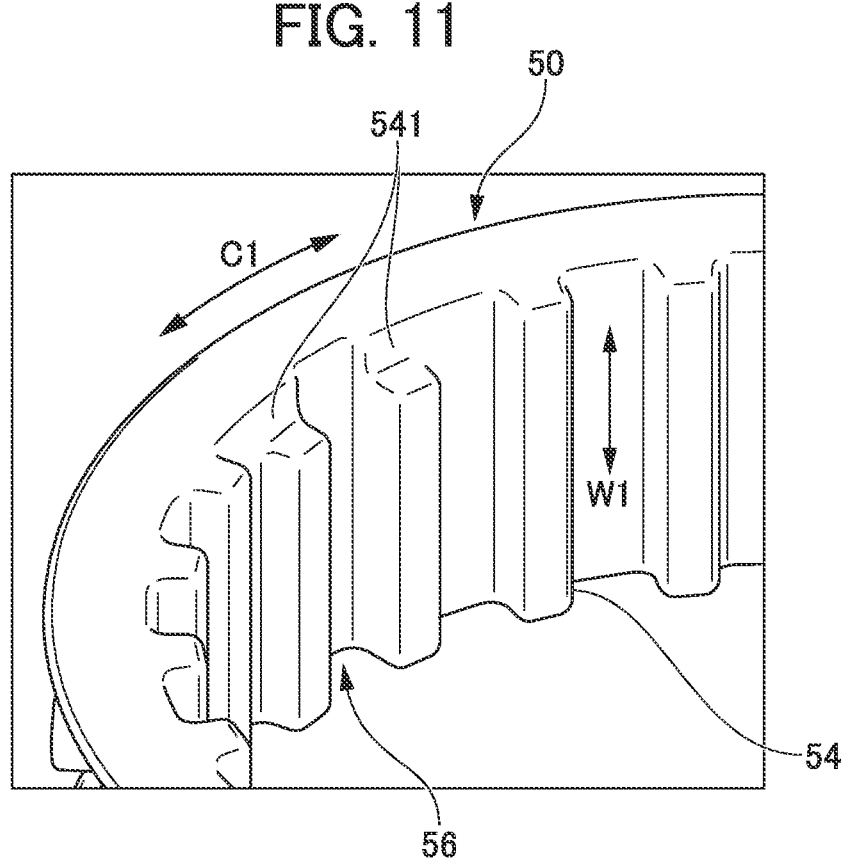
FIG. 11 is a perspective view of the elastic member showing the present invention in another configuration.

The elastic member protruding portions 54 is described based on FIG. 11. FIG. 11 is a perspective view showing the elastic member 50 formed to fit to the housing protruding portion 40 shown in FIG. 10. On the elastic member 50 shown in FIG. 11, notches 541 are provided on a part of the elastic member protruding portions 54. Each notch 541 is a part formed by cutting off a part of a corresponding elastic member protruding portion 54. In the case of the elastic member 50 shown in FIG. 11, an end part in the width direction W1 is cut off from each of two adjacent elastic member protruding portions 54. The cut-off parts correspond to the second protruding portions 402 of the housing protruding portion 40 shown in FIG. 10. That is, when the elastic member 50 is arranged on the elastic member arrangement portion 22, the second protruding portions 402 fit in the notches 541. Therefore, even though the second protruding portions 402 are provided on the elastic member arrangement portion 22, the elastic member 50 is arranged on the elastic member arrangement portion 22 without being separated from the surface of the elastic member arrangement portion 22.

Here, the elastic member arrangement portion 22 shown in FIG. 10 and the elastic member 50 shown in FIG. 11 can prevent wrong assembly. If wrong assembly is attempted, the second protruding portions 402 come into contact with corresponding elastic member protruding portions 54, and, therefore, the elastic member 50 cannot be wrapped around the elastic member arrangement portion 22 without being separated. Thereby, it is possible to prevent the wrong assembly.

Displacement

The first protruding portion 401 prevents displacement of the elastic member 50 in the circumferential direction C2 when the elastic member 50 is arranged on the elastic member arrangement portion 22. As is understood from FIGS. 10 and 11, when the elastic member 50 is arranged on the elastic member arrangement portion 22, the first protruding portion 401 fits into a corresponding elastic member receding portion 56 of the elastic member 50. In other words, at least a part of the elastic member protruding portions 54 are hooked by at least a part of the first protruding portion 401. Here, to be hooked means that movement of a component is restricted by contact with another component. Thereby, it is possible to prevent the elastic member 50 from being displaced in the circumferential direction C2 on the elastic member arrangement portion 22.

Another Form of Second Protruding Portions

Figure 12:
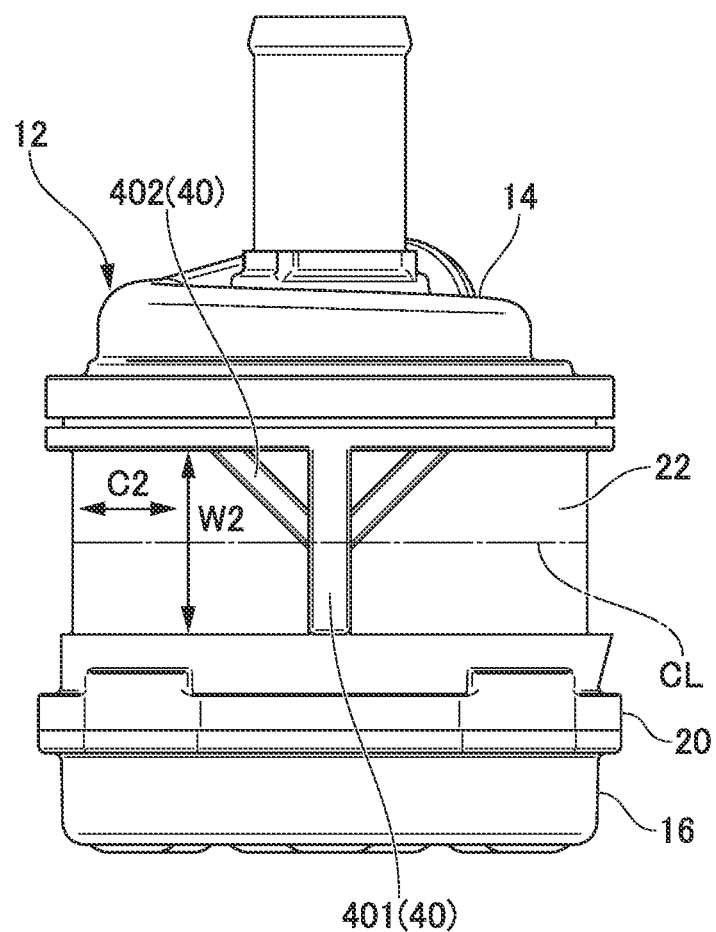
FIG. 12 is a side view of the pump body provided with the housing protruding portion of the present invention in another configuration.

FIG. 10 shows a configuration in which the housing protruding portion 40 is substantially T-shaped. That is, the configuration has been exemplified in which the second protruding portions 402 extend in the circumferential direction C2 on one end of the elastic member arrangement portion 22 in the width direction W2. The configuration of the second protruding portions 402 is not limited to the configuration shown in FIG. 10. From the viewpoint of preventing wrong assembly, the second protruding portions 402 only have to have a shape that is not symmetrical when the center line CL is the axis of symmetry. As such a shape, a U shape and a V shape can be exemplified. Another example of the second protruding portions 402 is described based on FIG. 12. FIG. 12 is a diagram corresponding to FIG. 10 and is a partial side view of the pump body 12 on which the housing protruding portion 40 in another configuration is provided on the elastic member arrangement portion 22. Though the housing protruding portion 40 shown in FIG. 10 is T-shaped, the housing protruding portion 40 shown in FIG. 12 is Y-shaped. That is, the second protruding portions 402 extend from the first protruding portion 401 to one end of the elastic member arrangement portion 22 in the width direction W2, in a direction diagonal to the width direction W2. Further, two second protruding portions 402 are symmetrically provided when the first protruding portion 401 is the axis of symmetry.

Notches of the Elastic Member

The notches 541 of the elastic member 50 correspond to the shape of the second protruding portions 402 of the housing protruding portion 40. That is, the notches 541 are formed at a position with which the second protruding portions 402 come into contact when the elastic member 50 is arranged on the elastic member arrangement portion 22. When the second protruding portions 402 are in shapes as shown in FIG. 12, the notches 541 of the elastic member protruding portions 54 are also formed at positions corresponding to the shapes. Thereby, it is possible to prevent wrong assembly similarly to the configuration shown in FIG. 10.

An embodiment of the present invention has been described above. The present invention, however, is not limited to the embodiment described above, and various changes and modifications are possible.

EXPLANATION OF REFERENCE NUMERALS

10 Electric pump
12 Pump body
13 Case
14 First case unit
141 Suction port
142 Discharge port
16 Second case unit
20 Housing
21 Outer circumferential surface
22 Elastic member arrangement portion
30 Protrusion
301 Pillar portion
302 Fastening portion
302H Hook part
302T Tapered part
40 Housing protruding portion
401 First protruding portion
402 Second protruding portions
50 Elastic member
501 First end
502 Second end
52 Engaging hole
54 Elastic member protruding portions
541 Notches
56 Elastic member receding portion
58 Outer surface
70 Fastener
701 Fastening hole
CL Center line
PL Parting line It is claimed:

1. An electric pump comprising:
a pump body including a pump unit and a housing covering the pump unit; and
an elastic member arranged on an outer circumferential surface of the housing,
the outer circumferential surface including an elastic member arrangement portion where the elastic member is arranged,
the elastic member arrangement portion including a protrusion,
the protrusion including a pillar portion extending in a direction of a normal line from the outer circumferential surface and a fastening portion extending from the pillar portion,
the fastening portion including a hook part protruding in a circumferential direction of the housing relative to the pillar portion,
the elastic member having holes formed in two opposite ends in a longitudinal direction of the elastic member, respectively, wherein
the holes are engaged with the protrusion,
the two opposite ends overlap with each other in a thickness direction of the opposite ends,
a distance from a surface of the elastic member arrangement portion to an outer surface of the elastic member in a radial direction of the housing where the two opposite ends overlap with each other is equal to an apparent thickness of non-overlapping portions of the elastic member
the elastic member arrangement portion is provided with a housing protruding portion,
the housing protruding portion has a shape asymmetrical with respect to a center line defined as an axis of symmetry, wherein the center line is a line that runs along a middle part of the elastic member arrangement portion in a width direction orthogonal to a circumferential direction of the elastic member arrangement portion,
a plurality of elastic member protruding portions is provided on a side of the elastic member that faces the elastic member arrangement portion, and
one or more of the plurality of elastic member protruding portions each have a notch at a position corresponding to the housing protruding portion.

2. The electric pump according to claim 1, wherein
the pillar portion and the fastening portion both have a substantially circular column shape, and
the fastening portion is larger in diameter than the pillar portion.

3. The electric pump according to claim 2, wherein
the holes of the elastic member are circular in plan view,
the holes have a diameter smaller than the fastening portion, and
the distance from the surface of the elastic member arrangement portion to the outer surface of the elastic member in the radial direction of the housing in the part where the two opposite ends overlap with each other is equal to a length of the pillar portion in the normal line direction.

* * * * *